(12) United States Patent
Byrd

(10) Patent No.: US 6,651,355 B2
(45) Date of Patent: Nov. 25, 2003

(54) RANGE FINDER FOR BOW HUNTER

(76) Inventor: William H. Byrd, 3225 Ivy La., Hernando, MS (US) 38632

( * ) Notice: Subject to any disclaimer, the term of this patent is extended or adjusted under 35 U.S.C. 154(b) by 15 days.

(21) Appl. No.: 09/906,641

(22) Filed: Jul. 18, 2001

(65) Prior Publication Data

US 2002/0011007 A1 Jan. 31, 2002

Related U.S. Application Data

(60) Provisional application No. 60/218,784, filed on Jul. 18, 2000.

(51) Int. Cl.⁷ .................................................. G01B 3/10
(52) U.S. Cl. ............................. 33/760; 33/283; 33/284; 33/755; 33/761; 33/391
(58) Field of Search .............................. 33/265, 275 R, 33/286, 291, 283, 284, 755, 759, 760, 761, 767, 391, 402

(56) References Cited

U.S. PATENT DOCUMENTS

| | | | | |
|---|---|---|---|---|
| 1,253,877 A | | 1/1918 | Payne | |
| 1,274,315 A | | 1/1918 | Olin | |
| 1,398,853 A | | 11/1921 | Ginzbourg | |
| 1,901,880 A | | 3/1933 | Shuster | |
| 2,692,437 A | * | 10/1954 | Cook | 33/759 |
| 2,893,656 A | * | 7/1959 | Carlson | 33/761 |
| 3,021,599 A | * | 2/1962 | Odom | 33/275 R |
| 3,568,322 A | * | 3/1971 | Showers | 33/768 |
| 3,616,539 A | * | 11/1971 | Carlson | 33/284 |
| 3,639,997 A | * | 2/1972 | Koeber | 33/284 |
| 4,228,589 A | * | 10/1980 | Chemay | 33/759 |
| 4,368,581 A | | 1/1983 | Tullos | |
| 4,476,635 A | * | 10/1984 | Hart | 33/761 |
| 5,594,994 A | * | 1/1997 | David | 33/283 |
| 5,718,056 A | * | 2/1998 | Miyasaka et al. | 33/761 |
| 6,079,111 A | | 6/2000 | Williams et al. | |
| 6,345,448 B1 | * | 2/2002 | Chontos | 33/334 |
| 6,363,622 B1 | * | 4/2002 | Stratton | 33/759 |

FOREIGN PATENT DOCUMENTS

DE                  143655         9/1980

\* cited by examiner

*Primary Examiner*—Diego Gutierrez
*Assistant Examiner*—Madeline Gonzalez
(74) *Attorney, Agent, or Firm*—Richard C. Litman

(57) ABSTRACT

A device for determining the range/height of distant objects using the triangulation method. The device includes a palm-sized housing having merely four main components; (1) a retractable tape measure; (2) a sighting slot; (3) a pendulum and (4) a calibrated graph. A reel is disposed on the rear wall of the housing to provide means for retracting the tape measure. The calibrated graph is imprinted on the face of a thin sheet, which sheet is attached to the front wall of the housing. A transparent cover is disposed to protect the face of the sheet. An offset portion on the sheet functions to prevent the pendulum from swinging freely when the device is not in use. The sighting slot is positioned at the top of the housing.

3 Claims, 3 Drawing Sheets

RANGE FINDER FOR BOW HUNTER

CROSS-REFERENCE TO RELATED APPLICATION

This application claims the benefit of U.S. Provisional Patent Application Ser. No. 60/218,784, filed Jul. 18, 2000.

BACKGROUND OF THE INVENTION

1. Field of the Invention

The present invention generally relates to measuring instruments. More specifically, the present invention is drawn to a hand-held device which utilizes the triangulation method for determining distance.

2. Description of Related Art

There are many devices available in the art which are utilized to determine the height of an object when direct measurement is difficult or impossible. These prior art devices employ the triangulation method for making the aforestated height determination. Examples of such prior art devices are shown in U.S. Pat. Nos. 1,253,877 (Payne), 1,274,315 (Olin) and East German Patent number 143,635. It is noted that the instant patents are only concerned with ascertaining the height of an object.

U.S. Pat. Nos. 1,398,853 (Ginzbourg) and 3,639,997 (Koeber) disclose devices for determining the distance of objects in order that a camera may be properly focused. There is no teaching in the immediately above patents for determining the height of an object.

U.S. Pat. Nos. 4,368,581 (Tullos) and 6,079,111 (Williams et al.) disclose range finder apparatuses which are attached to archery bows. The apparatuses are designed to be used only for archery functions.

U.S. Pat. No. 1,901,880 (Shuster) discloses a triangulation device which can be used to determine both height and distance. The device however, is relatively large and must be supported on a tripod.

None of the above inventions and patents, taken either singly or in combination, is seen to disclose a hand-held range and/or height determining device as will be subsequently described and claimed in the instant invention.

SUMMARY OF THE INVENTION

In the science of trigonometry, it is well known that all properties (length of the three sides and inclination of the two acute angles) of a right triangle may be determined if the length of one side of the triangle and the inclination of one of the acute angles is known. By employing established trigonometric ratios such as the tangent, sine, cosine, etc., the device of the present invention is capable of quickly and easily determining the range or the height of a distant object.

The device of the present invention comprises a palm-sized housing having merely four main components; (1) a retractable tape measure; (2) a sighting slot; (3) a pendulum and (4) a calibrated graph. A reel is disposed on the rear wall of the housing to provide means for retracting the tape measure. The calibrated graph is imprinted on the face of a thin sheet, which sheet is attached to the front wall of the housing. A transparent cover is disposed to protect the face of the sheet. The pendulum is supported from a pivot point and is deployed between the cover and the sheet to swing freely over the face of the sheet (and graph) when the device is in use. An offset portion on the sheet functions to prevent the pendulum from swinging freely when the device is not in use. The sighting slot is positioned at the top of the housing.

Accordingly, it is a principal object of the invention to provide a measuring device for determining, by triangulation, the range of a distant object.

It is another object of the invention to provide a measuring device for determining, by triangulation, the height of a distant object.

It is a further object of the invention to provide a measuring device which is compact and durable.

Still a further object of the invention is to provide a measuring device which is easy to use.

It is an object of the invention to provide improved elements and arrangements thereof in a device for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
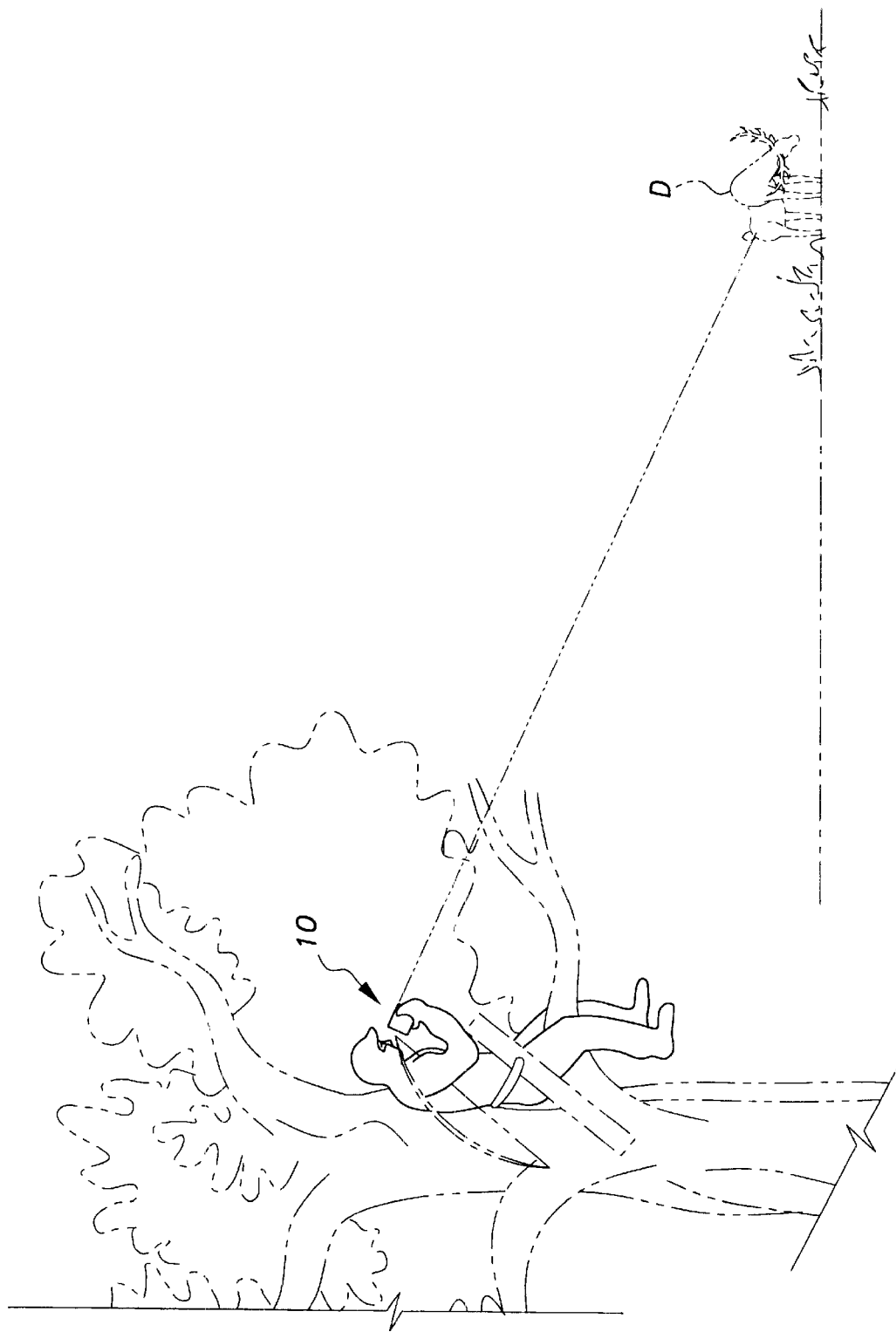
FIG. 1 is an environmental, perspective view of a range/height measuring device according to the present invention.
Figure 2:
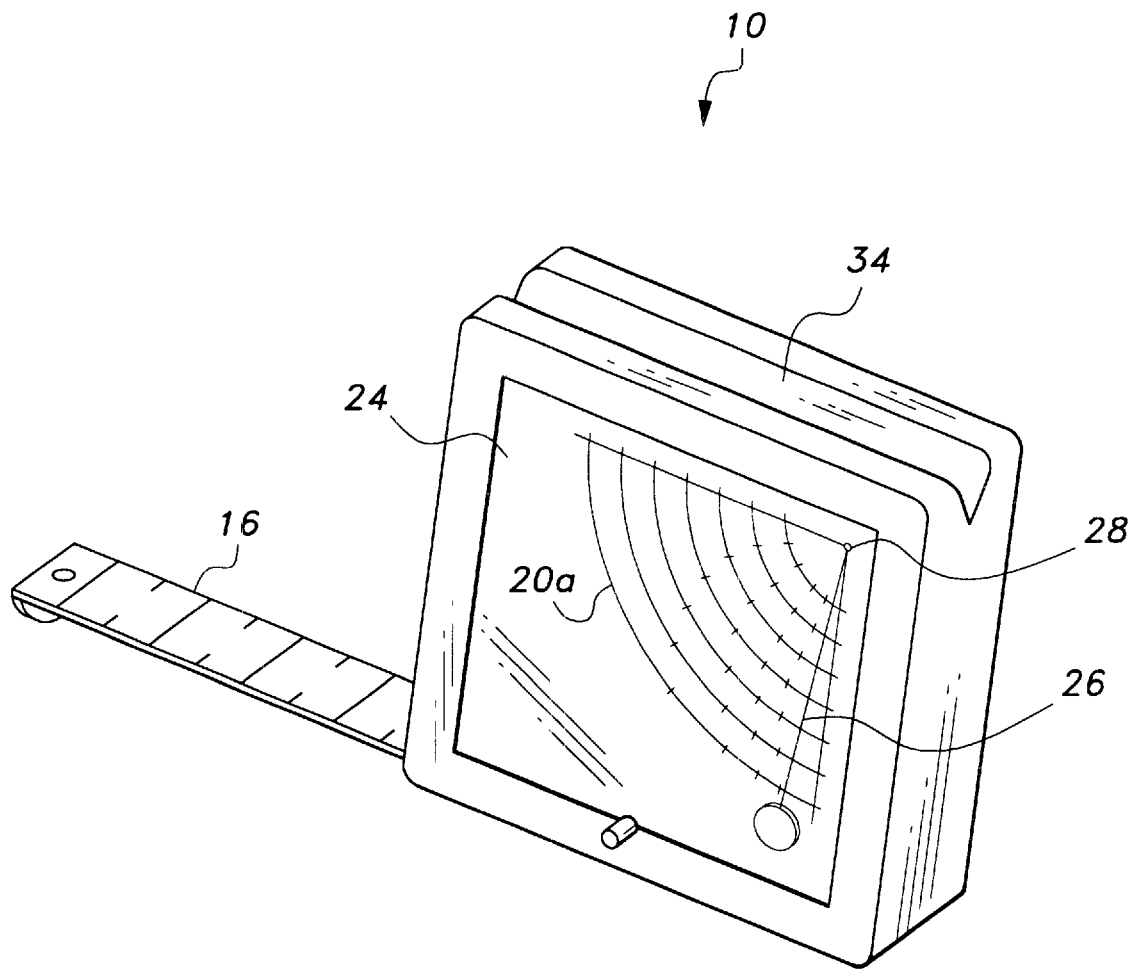
FIG. 2 is a perspective view of a range/height measuring device according to the present invention.
Figure 3:
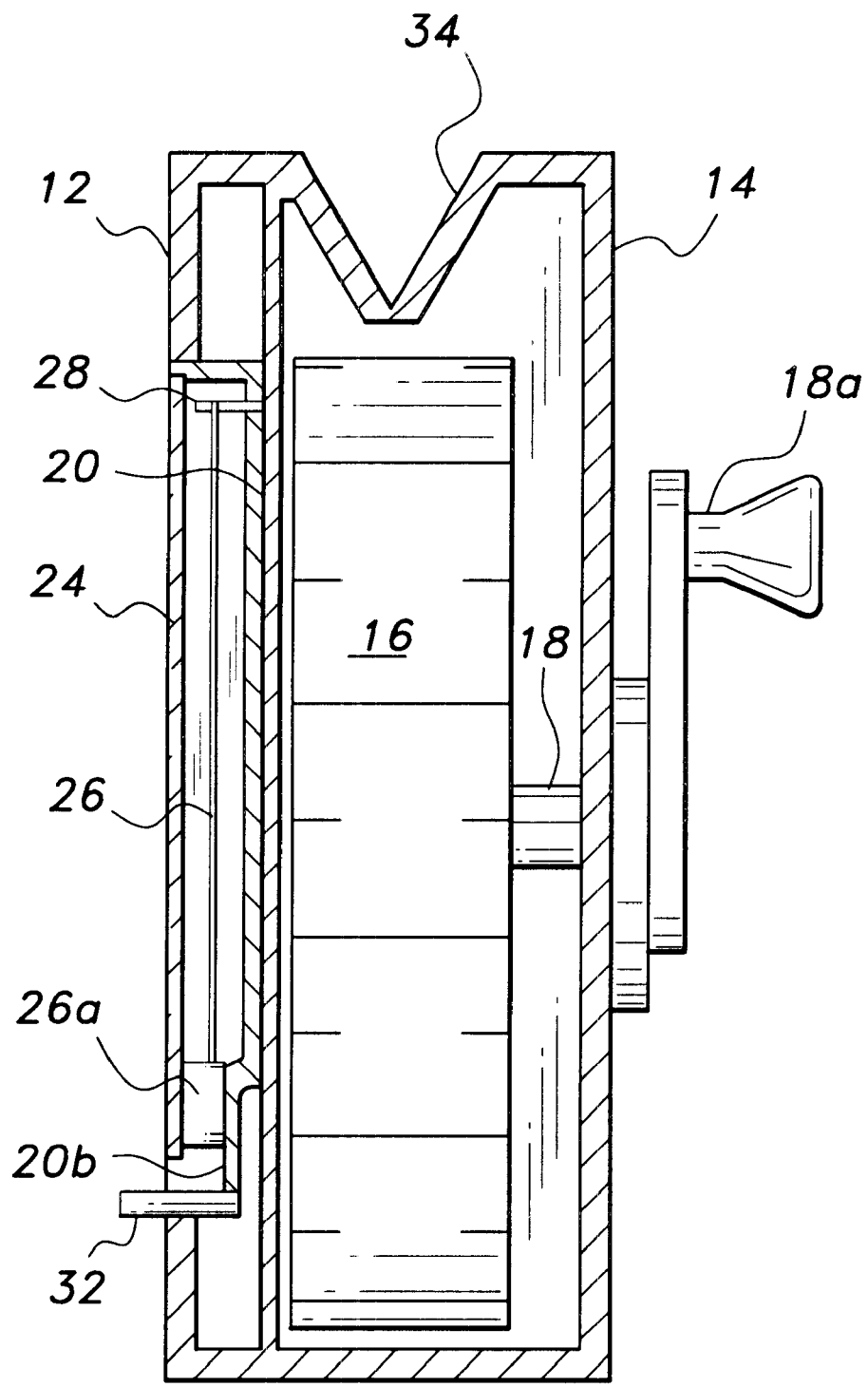
FIG. 3 is a sectional end view of a range/height measuring device according to the present invention.

As illustrated in FIGS. 1–3 the range/height measuring device of the instant invention is generally indicated at 10. As depicted in FIG. 1, device 10 is employed by a bow hunter to determine the range (distance) between the hunter and the intended game D.

As best seen in FIGS. 2 and 3 measuring device 10 comprises a hollow housing having a front wall 12 and a rear wall 14. A retractable tape measure 16 is positioned in the housing and is adapted to be wound on a reel 18 in a conventional manner. Tape measure 16 is fabricated from rugged material and is capable of supporting at least the weight of a bow and several arrows. A conventional flip-out handle 18a is provided on rear wall 14 to provide a mechanism for winding tape 16 onto reel 18. Front wall 12 is provided with an inset portion wherein is positioned a thin sheet 20. Sheet 20 may be fabricated from metallic or plastic material.

A calibrated graph 20a, whose function will be explained below, is imprinted on the face of sheet 20. A transparent panel 24 overlies the inset portion to protect the calibrated graph from any marring. Panel 24 may be fabricated from a material such as plexiglass or the like. A pendulum 26 is disposed in the space between panel 24 and graph 20a. Pendulum 26 is suspended from a pivot point 28 such that, in use, the pendulum is allowed to swing freely over the face of the graph until the pendulum hangs in a plumb position from the pivot point 28. Sheet 20 presents an offset portion 20b. In its normal position, portion 20b functions to pin the bob 26a of the pendulum against the inner surface of panel 24 when the measuring device is not in use and when it is desired to lock the pendulum in its plumb position. A release mechanism comprising a rod and push button 32 extends through the panel and is attached thereto such that the pendulum is released by simply pushing button 32 and thus, portion 20b inward. After the pendulum has attained plumb position, releasing the button will allow portion 20b to return to its normal position, pinning bob 26a against panel 24. An aiming sight 34 is positioned atop device 10 and is perpendicular to a baseline (not shown), which baseline is a reference line which intersects pivot point 28. Although shown as an elongate slot, it is obvious that sight 34 could take on other forms such as, for example, an enclosed elongate hole.

In the preferred embodiment, graph 20a is calibrated based on trigonometric data derived relative tare imprinted on the face of the graph and extend across the face from each height designation. The curved lines are marked at increments, in accord with tangential data, to indicate the distance from the device to the sighted object.

When utilizing the device in a deer hunting scenario, a bow hunter might employ the following steps: (1) fasten the end of the tape measure to your equipment (bow, arrows, etc.) before climbing the tree to the stand, leaving your equipment on the ground and extending the tape measure as you climb; (2) when you reach the stand, use the tape measure to take a measurement from eye level to the ground (this measurement will be the height imprinted on the side of the graph); (3) pull up your equipment and reel in the tape; (4) choose a landmark (tree, rock, path, etc.); (5) aim at the base of a landmark through the sighting slot and at the same time press the button to release the pendulum; (6) while still aiming at the landmark, release the button to lock the pendulum in its plumb position; (7) look at the calibrated graph and find your height on the side of the graph as measured in step (2); (8) follow the curved line from this height to the point where it intersects the pendulum. The distance marked on the curved line at the point of intersection is the distance from the base of the tree (usually in yards) to the landmark. This determination may be applied to several landmarks in the area so that when a deer appears at any of the chosen landmarks, the hunter will immediately know the distance his arrow must travel.

While the above example is for range determination for hunting, it is obvious that the instant invention could be utilized in forestry or construction to determine heights simply by changing the calibrated graph and aiming from the opposite end of the sight.

It is to be understood that the present invention is not limited to the sole embodiment described above, but encompasses any and all embodiments within the scope of the following claims.

I claim:

1. A range or height determining device comprising:

a housing, said housing having a front wall with an outer surface, a rear wall, a top wall, a bottom wall and two side walls forming an enclosure;

an opening disposed in one of said two side walls;

a retractable tape measure, said retractable tape measure disposed in said housing and having a free end exiting through said opening;

an inset portion, said inset portion disposed in said outer surface of said front wall, said inset portion having an upper corner;

a thin sheet having an outer face, said thin sheet positioned on said inset portion;

data relative to a trigonometric function imprinted on said outer face of said thin sheet;

a pivot point, said pivot point positioned in said upper corner of said inset portion;

a pendulum suspended from said pivot point, said pendulum adapted to swing across said outer face of said thin sheet;

a transparent panel, said transparent panel disposed on said front wall to cover said thin sheet and said pendulum;

an offset portion formed on said thin sheet;

a push button attached to said offset portion and extending through said transparent panel; and an aiming sight, said aiming sight disposed on said top wall.

2. A range or height determining device as recited in claim 1, wherein said aiming sight is an elongated slot formed in said top wall.

3. A range or height determining device as recited in claim 1, including a reel handle disposed on said rear surface for retracting said retractable tape measure.

* * * * *